Patented Nov. 30, 1943

2,335,535

UNITED STATES PATENT OFFICE 2,335,535

DISAZO PIGMENTS AND METHOD OF PRODUCING

William B. Reynolds, Elmhurst, Long Island, N. Y., assignor to Interchemical Corporation, New York, N. Y., a corporation of Ohio No Drawing. Application June 12, 1940,
Serial No. 340,046

7 Claims. (Cl. 260—148)

This invention relates to disazo pigments, and has particular reference to new pigments characterized by cleanliness of tone combined with fastness to light and resistance to bleeding in organic solvents. Specifically, this invention relates to the copper complexes obtainable from the couplings of beta oxy naphthoic acid with certain tetrazotized primary aromatic diamines.

There has been considerable demand, particularly in the field of pigment printing on textiles, for pigments which would combine the features of brilliance of tone, fastness to light, and resistance to solvents such as acetone, while showing extremely good resistance to water and dilute soap solutions. In particular, acceptable browns and violets have been difficult to obtain unless insoluble vat dyestuffs are used.

I have discovered certain azo pigments which combine cleanliness of color with light fastness, wash-resistance and insolubility in organic solvents. These pigments comprise the coppered complexes of the couplings of beta oxy naphthoic acid with tetrazotized primary aromatic diamines of the general formula:

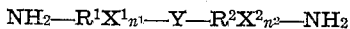

where $R^1$ and $R^2$ are benzene or naphthalene nuclei, $X^1$ and $X^2$ are substituents of the group consisting of hydrogen alkyl, aryl, aralkyl, alkoxy, halogen and nitro, $n^1$ and $n^2$ are numbers from 1 to 3, and Y is a bond, oxygen, carbonyl or alkyl.

The colors produced vary in shade, being browns, dull blues and violets of good cleanliness. They may be represented by the general formula:

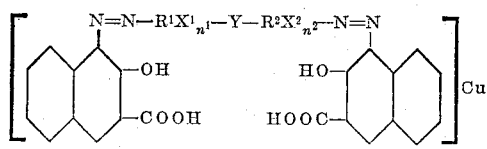

where $R^1$ and $R^2$ are benzene or naphthalene nuclei, $X^1$ and $X^2$ are substituents of the group consisting of hydrogen alkyl, aryl, aralkyl, alkoxy, halogen and nitro, $n^1$ and $n^2$ are numbers from 1 to 3, and Y is a bond, oxygen, carbonyl or alkyl.

Typical amines which can be used include benzidine, tolidine, dianisidine, dichlor benzidine, tetra chlor benzidine, diamino diphenyl ether, diamino benzo phenone and diamino diphenyl methane.

Typical examples of my invention are the following:

Example 1

246 parts of dianisidine are slurried with 3000 parts of water and 138 parts of sodium nitrite. The slurry is iced to 0° C. and tetrazotized by the addition of 250 parts of 10N hydrochloric acid. The tetrazo thus prepared is run into a cold coupling solution prepared by dissolving 370 parts of beta hydroxy naphthoic acid in 5000 parts of water with 500 parts of soda ash. When coupling is complete the charge is heated with steam to 90° C., and coppered by the gradual addition of 540 parts of blue vitriol dissolved in 1500 parts of hot water. The charge is held at 90–100° C. for ½ hour, then filtered and washed salt free. The 25% pulp obtained is a very clean bluish gray pigment.

Example 2

252 parts of dichlor benzidine, substituted for the dianisidine, gives a reddish gray pigment. 184 parts of benzidine yields a blue violet, while tolidine gives a bright blue gray.

The typical precautionary measures useful in diazotization reactions should be observed, these varying of course with the particular amine. In coupling, I prefer to operate with the beta oxy naphthoic acid partially out of solution, as I find that improved results are obtained in more concentrated coupling solutions.

The copper probably couples by forming a complex between the phenolic hydroxyl and the carboxyl group. I find that about 10 to 15% excess of copper is desirable over that necessary to produce the theoretical equi-molar complex with the beta-oxy naphthoic acid (i. e. two mols of copper per mol of dyestuff). The coppering can take place in neutral or alkaline solutions (pH 7.0 or higher), the copper may be present as a simple salt, or as a complex such as the copper ammonium complex. In general, rather elevated temperatures (60–100° C.) are necessary to insure complete coppering.

Obviously, many changes can be made in the specific examples without departing from the scope of the invention, which is defined in the claims.

I claim:

1. As new pigment dyestuffs, compounds of the general formula:

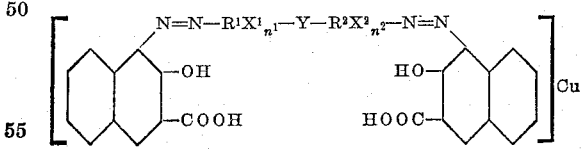

where $X^1$ and $X^2$ are substituents of the group consisting of hydrogen, alkyl, alkoxy, halogen and nitro, $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, in the form of finely divided water-insoluble pigment powders.

2. As new pigment dyestuffs, compounds of the following formula:

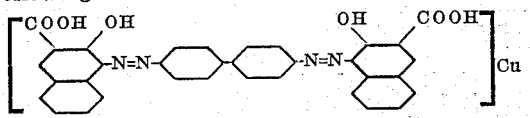

in the form of finely divided water-insoluble pigment powders.

3. As new pigment dyestuffs, compounds of the following formula:

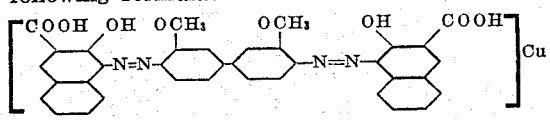

in the form of finely divided water-insoluble pigment powders.

4. As new pigment dyestuffs, compounds of the following formula:

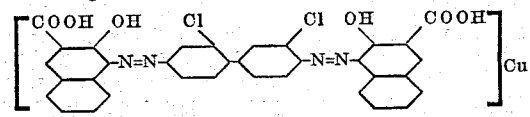

in the form of finely divided water-insoluble pigment powders.

5. The method of making a pigment dyestuff, which comprises tetrazotizing a diamine of the formula:

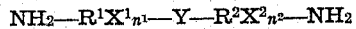

where $X^1$ and $X^2$ are substituents of the group consisting of hydrogen, alkyl, alkoxy, halogen and nitro, $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, coupling the tetrazo compound with beta hydroxy naphthoic acid, and coppering in substance the azo compound so produced.

6. The method of making a pigment dyestuff, which comprises tetrazotizing a diamine of the formula:

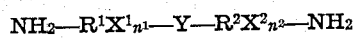

where $X^1$ and $X^2$ are substituents of the group consisting of hydrogen, alkyl, alkoxy, halogen and nitro, $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, coupling the tetrazo compound with beta hydroxy naphthoic acid, and coppering in substance the azo compound so produced by treatment with a copper compound at a pH of at least 7.0.

7. The method of making a pigment dyestuff, which comprises tetrazotizing a diamine of the formula:

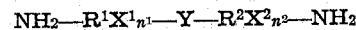

where $X^1$ and $X^2$ are substituents of the group consisting of hydrogen, alkyd, alkoxy, halogen and nitro, $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, coupling the tetrazo compound with beta hydroxy naphthoic acid, and coppering in substance the azo compound so produced by treatment with a copper compound at a pH of at least 7.0 at a temperature of at least 60° C.

WILLIAM B. REYNOLDS.